United States Patent
Gross et al.

(10) Patent No.: US 7,869,965 B2
(45) Date of Patent: Jan. 11, 2011

(54) INFERENTIAL POWER MONITOR WITHOUT VOLTAGE/CURRENT TRANSDUCERS

(75) Inventors: Kenny C. Gross, San Diego, CA (US); Kalyanaraman Vaidyanathan, San Diego, CA (US); Ramakrishna C. Dhanekula, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1489 days.

(21) Appl. No.: 11/205,924

(22) Filed: Aug. 17, 2005

(65) Prior Publication Data

US 2007/0040582 A1 Feb. 22, 2007

(51) Int. Cl.
G01R 21/00 (2006.01)
G01R 11/00 (2006.01)
G06F 19/00 (2006.01)
G06F 17/40 (2006.01)

(52) U.S. Cl. .................. 702/60; 340/635; 340/653; 702/57; 702/61; 702/182; 702/189

(58) Field of Classification Search ............ 73/865.8, 73/865.9; 324/76, 104 R, 142, 76.11; 340/500, 340/540, 635, 653; 702/1, 57, 58, 60, 61, 702/62, 127, 182, 187, 189
See application file for complete search history.

(56) References Cited

U.S. PATENT DOCUMENTS

| | | | | |
|---|---|---|---|---|
| 4,937,763 A | | 6/1990 | Mott | 364/550 |
| 5,383,137 A | * | 1/1995 | Burch | 703/23 |
| 5,557,557 A | | 9/1996 | Frantz et al. | |
| 5,754,435 A | * | 5/1998 | Sato | 702/60 |
| 5,838,579 A | * | 11/1998 | Olson et al. | 716/2 |
| 5,903,476 A | * | 5/1999 | Mauskar et al. | 716/1 |
| 5,949,689 A | * | 9/1999 | Olson et al. | 703/14 |
| 6,002,878 A | | 12/1999 | Gehman et al. | |
| 6,480,815 B1 | * | 11/2002 | Olson et al. | 703/14 |
| 6,876,943 B2 | | 4/2005 | Wegerich | 702/127 |
| 7,725,848 B2 | * | 5/2010 | Nebel et al. | 716/4 |
| 7,756,652 B2 | * | 7/2010 | Lewis et al. | 702/60 |

(Continued)

FOREIGN PATENT DOCUMENTS

EP 0 789 292 A2 * 8/1997

(Continued)

OTHER PUBLICATIONS

Eugenio Schuster et al., "Multi-Frequency Sinusoidal Perturbation Method for Dynamic Characterization of Multi-Processor Computer Servers", XP-002421589.

(Continued)

*Primary Examiner*—Edward R Cosimano
(74) *Attorney, Agent, or Firm*—Park, Vaughan, Fleming & Dowler, LLP

(57) ABSTRACT

A system that facilitates estimating power consumption in a computer system by inferring the power consumption from instrumentation signals. During operation, the system monitors instrumentation signals within the computer system, wherein the instrumentation signals do not include corresponding current and voltage signals that can be used to directly compute power consumption. The system then estimates the power consumption for the computer system by inferring the power consumption from the instrumentation signals and from an inferential power model generated during a training phase.

21 Claims, 2 Drawing Sheets

U.S. PATENT DOCUMENTS

2004/0078723 A1 4/2004 Gross et al.
2005/0055590 A1 3/2005 Farkas et al.
2005/0204316 A1* 9/2005 Nebel et al. .................... 716/2
2009/0271046 A1* 10/2009 Lewis et al. ................. 700/291

FOREIGN PATENT DOCUMENTS

| EP | 0 875 833 A1 | * | 11/1998 |
| EP | 2000293557 | | 10/2000 |
| EP | 2002334128 | | 11/2001 |
| JP | 2000-293557 A | * | 10/2000 |
| JP | 2002-334128 A | * | 11/2002 |

OTHER PUBLICATIONS

Gribok, Andrei V. et al., "Use of Kernel Based Techniques for Sensor Validation in Nuclear Power Plants", International Topical Meeting on Nuclear Plant Instrumentation, Controls and Human-Machine Interface Technologies, Washington D.C., Nov. 2000.

* cited by examiner

INFERENTIAL POWER MONITOR WITHOUT VOLTAGE/CURRENT TRANSDUCERS

BACKGROUND

1. Field of the Invention

The present invention relates to techniques for determining power consumption in a computer system. More specifically, the present invention relates to a method and apparatus for generating a dynamic trace of power consumption in a computer system without using voltage/current transducers.

2. Related Art

Large businesses often maintain datacenters containing dozens or even hundreds of servers that provide various computational services. Since excess heat can cause premature failure of components within servers, providing sufficient cooling capacity to remove the heat generated by these servers is a primary concern for managers of these datacenters.

At the present moment, large datacenters typically over-provision cooling capacity. More specifically, large datacenters typically provision cooling capacity by adding up the faceplate power ratings for each server in the datacenter and then providing sufficient cooling capacity to meet this estimated maximum level of power consumption. Typically, the faceplate power rating is higher than it is possible to achieve because the faceplate power ratings are extremely conservative estimates of the maximum theoretically possible power consumption of the individual components and the field-replaceable units (FRUs) within a server.

Note that the faceplate power rating is typically determined by adding up the power rating of each individual component and each FRU within the server. Therefore, the conservatively high power rating estimates for these individual components and FRUs is reflected in the faceplate power rating.

Furthermore, average server utilization factors are low. As a result, datacenters are being designed with a large amount of maximum cooling capacity, even though the actual cooling requirements may never exceed half of the maximum cooling capacity. Thus, it is desirable to be able to accurately measure the dynamic power consumption of servers to prevent needless and expensive over-provisioning of cooling systems for the servers.

One technique for measuring the dynamic power consumption of a server is to place a hardware power monitor between an external power supply and the server. Unfortunately, a hardware power monitor is expensive, typically costing many thousands of dollars. Furthermore, a hardware power monitor only measures the total power entering the server and hence cannot report on the power consumption of the individual components within the server.

Another technique for measuring the dynamic power consumption of a server is to monitor voltage and current signals reported by sensors in the power supply to calculate the dynamic power consumption of the server.

Unfortunately, not all servers have voltage and current sensors in their power supplies. Hence, for these types of servers, the only way to measure power consumption is to use a hardware power monitor.

What is needed is a method and an apparatus for measuring power consumption in a computer system without the problems described above.

SUMMARY

One embodiment of the present invention provides a system that facilitates estimating power consumption in a computer system by inferring the power consumption from instrumentation signals. During operation, the system monitors instrumentation signals within the computer system, wherein the instrumentation signals do not include corresponding current and voltage signals that can be used to directly compute power consumption. The system then estimates the power consumption for the computer system by inferring the power consumption from the instrumentation signals and from an inferential power model generated during a training phase.

In a variation on this embodiment, to estimate the power consumption, the system first pre-processes the instrumentation signals using an analytical re-sampling program. The system then uses a nonlinear, nonparametric regression technique to produce an inferential power estimate from the pre-processed instrumentation signals and the inferential power model.

In a further variation on this embodiment, to generate the inferential power model during the training phase, the system monitors the instrumentation signals within the computer system and concurrently monitors a corresponding power consumption using a hardware power monitor attached to the computer system. Next, the system pre-processes the monitored instrumentation signals and the corresponding monitored power consumption using an analytical re-sampling program. The system then uses a nonparametric regression technique to build an inferential power model from the pre-processed instrumentation signals and corresponding power consumption.

In yet a further variation, a linear regression technique is used to produce the inferential power estimate from the pre-processed instrumentation signals and the inferential power model.

In a variation on this embodiment, the nonlinear, nonparametric regression technique can include a multivariate state estimation technique.

In a variation on this embodiment, the instrumentation signals can include hardware variables and/or software variables.

In a variation on this embodiment, the software variables include load metrics, CPU utilization, idle time, memory utilization, disk activity, transaction latencies, and other performance metrics reported by the operating system.

In a variation on this embodiment, the hardware variables include temperature and voltage.

In a variation on this embodiment, only software variables are used to estimate the power consumption of the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Real-Time Telemetry System

Figure 1:
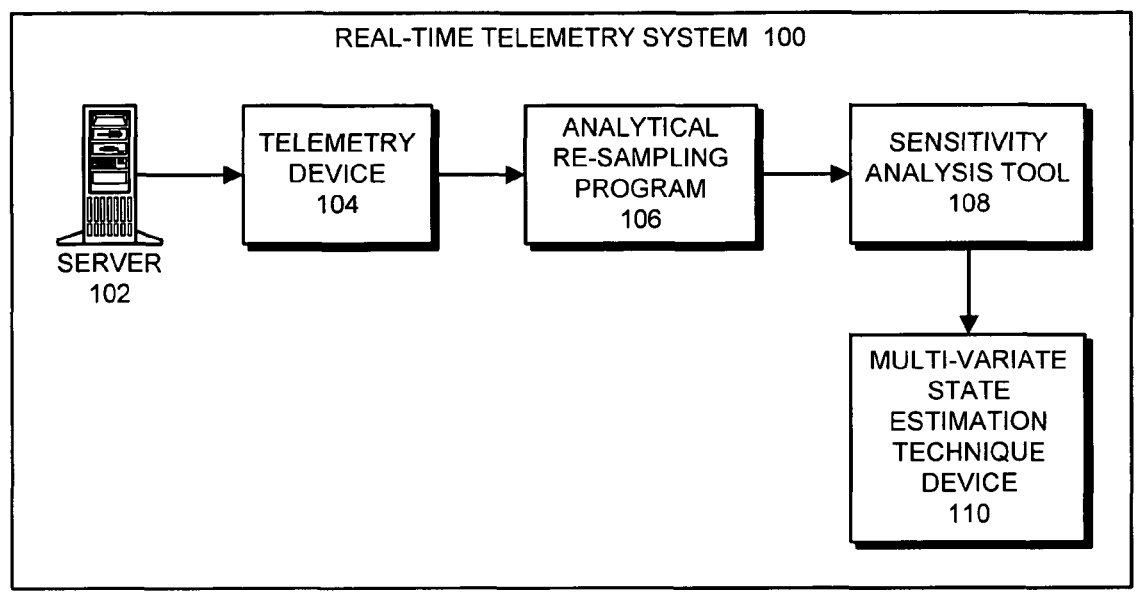
FIG. 1 illustrates a real-time telemetry system in accordance with an embodiment of the present invention.

FIG. 1 illustrates real-time telemetry system 100 in accordance with an embodiment of the present invention. Real-time telemetry system 100 contains server 102, which can generally include any computational node including a mechanism for servicing requests from a client for computational and/or data storage resources. In the present embodiment, server 102 is a high-end uniprocessor or multiprocessor server that is being monitored by real-time telemetry system 100.

Real-time telemetry system 100 also contains telemetry device 104, analytical re-sampling program 106, sensitivity analysis tool 108, and multi-variate state estimation technique (MSET) device 110. Telemetry device 104 gathers information from the various sensors and monitoring tools within server 102, and directs the signals to a remote location that contains analytical re-sampling program 106, sensitivity analysis tool 108, and MSET device 110.

The term "MSET" as used in this specification refers to a multivariate state estimation technique, which loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

The analytical re-sampling program 106 ensures that the signals have a uniform sampling rate. In doing so, analytical re-sampling program 106 uses interpolation techniques, if necessary, to fill in missing data points, or to equalize the sampling intervals when the raw data is non-uniformly sampled.

After the signals pass through analytical re-sampling program 106, they are aligned and correlated by sensitivity analysis tool 108. For example, in one embodiment of the present invention sensitivity analysis tool 108 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 108.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 108.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the MSET device 110.

Nonlinear, Nonparametric Regression

The present invention introduces a novel approach for measuring power consumption in a computer system. To this end, the present invention uses an advanced pattern recognition approach, which takes data gathered from software variables reported by the operating system, hardware variables generated by the sensors in the computer system, and an inferential model of the power consumption which is generated during a training phase, to produce a dynamic trace of power consumption in the computer system.

The present invention continuously monitors a variety of instrumentation signals in real time during operation of the server. (Note that although we refer to a single computer system in this disclosure, the present invention also applies to a collection of computer systems).

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, such as internal temperatures and voltages.

The foregoing instrumentation parameters are monitored continuously with an advanced statistical pattern recognition technique. One embodiment of the present invention uses a class of techniques known as nonlinear, nonparametric (NLNP) regression techniques, such as the Multivariate State Estimation Technique, MSET. Alternatively, the present invention can use other pattern recognition techniques, such as neural networks or other types of NLNP regression. Another embodiment of the present invention uses a linear regression technique. In each case, the pattern recognition module "learns" how the behavior of the monitored variables relates to the actual power consumption of the computer system. The pattern recognition module then generates an "inferential power model" that is used to estimate the power consumption of the computer system without having to use a hardware power monitor.

In one embodiment of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Training Phase

Figure 2:
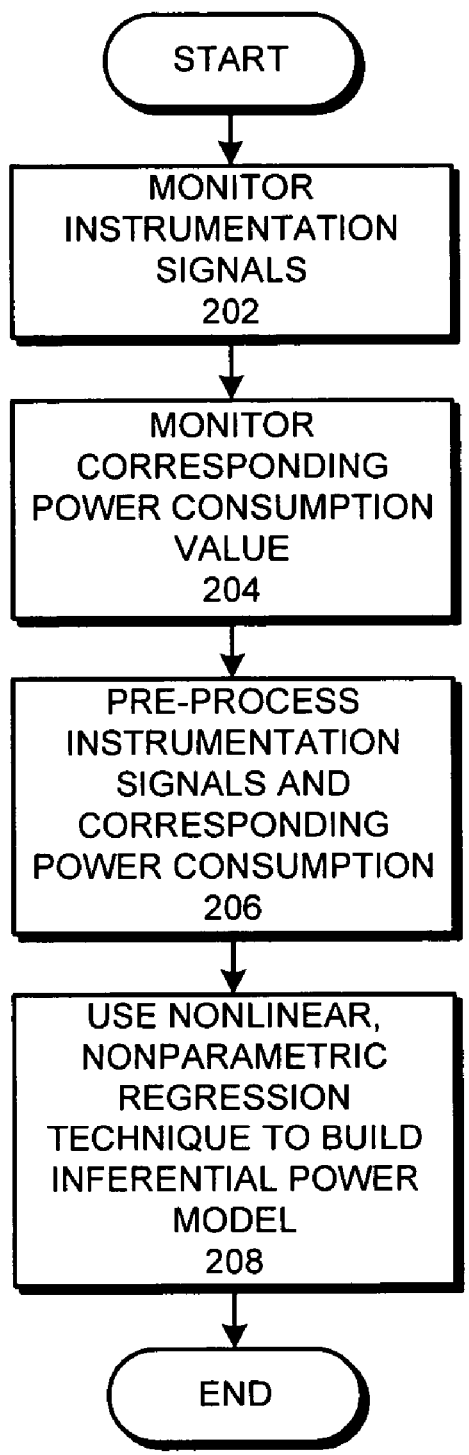
FIG. 2 presents a flow chart illustrating a process for generating an inferential power model for a computer system in accordance with an embodiment of the present invention.

FIG. 2 presents a flow chart illustrating a process for generating an inferential power model for a computer system in a given class of computer systems in accordance with an embodiment of the present invention. The process begins when the system monitors instrumentation signals reported in real-time within the computer system (step 202). Note that the instrumentation signals can be software and/or hardware variables. The software variables can include load metrics, CPU utilization, idle time, memory utilization, disk activity transaction latencies, and other performance metrics reported by the operating system. The hardware variables can include temperature signals and voltage signals.

The system simultaneously monitors the corresponding power consumption value as reported by a hardware power monitor (step 204). The hardware power monitor is a device, which is deployed between the external power supply and the computer system and which reports the dynamic power consumption of the computer system.

Next, the system pre-processes the instrumentation signals and the corresponding power consumption values by using an analytical re-sampling program, which removes outlier and flat data (step 206). The system then uses a nonlinear, nonparametric regression technique, such as MSET, to build an inferential power model that correlates the pre-processed instrumentation signals and the corresponding power consumption values (step 208). During the monitoring phase, the system uses this inferential power model to estimate the power for the computer system when no hardware power monitor is available.

Note that since a computer system in a given class of computer systems is typically similar to other computer systems in the given class, the inferential power model can be used with any computer system within that given class.

In one embodiment of the present invention, the inferential power model allows the system to estimate the power consumption of a computer system even if there are no hardware sensors (i.e. temperature, voltage, current, etc.) in the computer system. In this embodiment, the inferential power model uses the software variables alone to estimate the power consumption of the computer system.

Monitoring Phase

Figure 3:
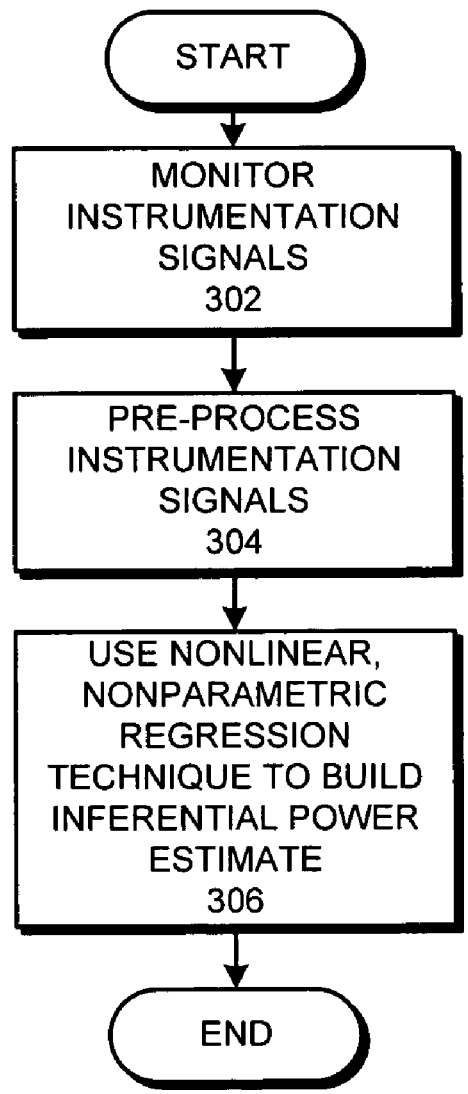
FIG. 3 presents a flow chart illustrating a process for generating an inferential power estimate for a computer system in accordance with an embodiment of the present invention.

FIG. 3 presents a flow chart illustrating a process for generating an inferential power estimate for a computer system in accordance with an embodiment of the present invention. The process begins when the system monitors instrumentation signals reported in real-time within the computer system (step 302). Note that the hardware power monitor is no longer connected to the computer system. Next, the system pre-processes the instrumentation signals using an analytical re-sampling program (step 304). The system then uses a nonlinear, nonparametric regression technique to generate an inferential power estimate from the pre-processed instrumentation signals and the inferential power model generated during the training phase (step 306).

Note that since the system generates the inferential power model using real-time data from the computer system, the resulting inferential power estimate provides an estimated dynamic trace of power consumption in the computer system.

In one embodiment of the present invention, the system does not use voltage and/or current variables, but instead uses other physical variables and software variables to produce the inferential power estimate.

In one embodiment of the present invention, the system does not use hardware variables, but instead, uses only the software variables to produce the inferential power estimate.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for estimating power consumption in a computer system by inferring the power consumption from instrumentation signals, comprising:

during a training phase:
monitoring instrumentation signals within the computer system, wherein the instrumentation signals do not include corresponding current and voltage signals that can be used to directly compute power consumption;
monitoring a corresponding power consumption using a hardware power monitor coupled to the computer system; and
generating an inferential power model from the instrumentation signals and the corresponding monitored power consumption; and during a monitoring phase that does not include the training phase:
monitoring the instrumentation signals within the computer system; and
estimating the power consumption for the computer system by inferring the power consumption from the instrumentation signals monitored during the monitoring phase and from the inferential power model generated during the training phase.

2. The method of claim 1, wherein estimating the power consumption further involves:
pre-processing the instrumentation signals using an analytical re-sampling program; and
using a nonlinear, nonparametric regression technique to produce an inferential power estimate from the pre-processed instrumentation signals and the inferential power model.

3. The method of claim 2, wherein the nonlinear, nonparametric regression technique can include a multivariate state estimation technique.

4. The method of claim 2, wherein generating the inferential power model during the training phase involves:
pre-processing the monitored instrumentation signals and the corresponding monitored power consumption using an analytical re-sampling program; and
using a nonparametric regression technique to build the inferential power model from the pre-processed instrumentation signals and the corresponding monitored power consumption.

5. The method of claim 4, wherein a linear regression technique is used to produce the inferential power estimate from the pre-processed instrumentation signals and the inferential power model.

6. The method of claim 1, wherein the instrumentation signals can include hardware variables and/or software variables.

7. The method of claim 6, wherein the software variables include load metrics, CPU utilization, idle time, memory utilization, disk activity, transaction latencies, and other performance metrics reported by the operating system.

8. The method of claim 6, wherein the hardware variables include temperature and voltage.

9. The method of claim 6, wherein only software variables are used to estimate the power consumption of the computer system.

10. An apparatus for estimating power consumption in a computer system by inferring the power consumption from instrumentation signals, comprising:
a computer system; and
a power-estimation mechanism;
wherein, during a training phase, the power-estimation mechanism is configured to:
monitor instrumentation signals within the computer system, wherein the instrumentation signals do not include corresponding current and voltage signals that can be used to directly compute power consumption;
monitor a corresponding power consumption using a hardware power monitor coupled to the computer system; and
generate an inferential power model from the instrumentation signals and the corresponding monitored power consumption; and
wherein, during a monitoring phase that does not include the training phase, the power-estimation mechanism is configured to:
monitor the instrumentation signals within the computer system; and
estimate the power consumption for the computer system by inferring the power consumption from the instrumentation signals monitored during the monitoring phase and from the inferential power model generated during the training phase.

11. The apparatus of claim 10, wherein while estimating the power consumption, the power-estimation mechanism is configured to:
pre-process the instrumentation signals using an analytical re-sampling program; and to
use a nonlinear, nonparametric regression technique to produce an inferential power estimate from the pre-processed instrumentation signals and the inferential power model.

12. The apparatus of claim 11, wherein the nonlinear, nonparametric regression technique can include a multivariate state estimation technique.

13. The apparatus of claim 11, wherein while generating the inferential power model during the training phase, the power-estimation mechanism is configured to:
pre-process the monitored instrumentation signals and the corresponding monitored power consumption using the analytical re-sampling program; and to
use a nonparametric regression technique to build the inferential power model from the pre-processed instrumentation signals and the corresponding monitored power consumption.

14. The method of claim 13, wherein a linear regression technique is used to produce an inferential power estimate from the pre-processed instrumentation signals and the inferential power model.

15. The apparatus of claim 10, wherein the instrumentation signals can include hardware variables and/or software variables.

16. The apparatus of claim 15, wherein the software variables include load metrics, CPU utilization, idle time, memory utilization, disk activity, transaction latencies, and other performance metrics reported by the operating system.

17. The apparatus of claim 15, wherein the hardware variables include temperature and voltage.

18. The apparatus of claim 15, wherein only software variables are used to estimate the power consumption of the computer system.

19. A computer system for estimating power consumption in a computer system by inferring the power consumption from instrumentation signals, comprising:
a computer system; and
a power-estimation mechanism;
wherein, during a training phase, the power-estimation mechanism is configured to:
monitor instrumentation signals within the computer system, wherein the instrumentation signals do not include corresponding current and voltage signals that can be used to directly compute power consumption;
monitor a corresponding power consumption using a hardware power monitor coupled to the computer system; and
generate an inferential power model from the instrumentation signals and the corresponding monitored power consumption; and
wherein, during a monitoring phase that does not include the training phase, the power-estimation mechanism is configured to:
monitor the instrumentation signals within the computer system; and
estimate the power consumption for the computer system by inferring the power consumption from the instrumentation signals monitored during the monitoring phase and from the inferential power model generated during the training phase.

20. The computer system of claim 19, wherein while estimating the power consumption, the power-estimation mechanism is configured to:
pre-process the instrumentation signals using an analytical re-sampling program; and to
use a nonlinear, nonparametric regression technique to produce an inferential power estimate from the pre-processed instrumentation signals and the inferential power model.

21. The computer system of claim 20, wherein while generating the inferential power model during the training phase, the power-estimation mechanism is configured to:
    pre-process the monitored instrumentation signals and the corresponding monitored power consumption using an analytical re-sampling program; and to
    use a nonparametric regression technique to build the inferential power model from the pre-processed instrumentation signals and the corresponding monitored power consumption.

* * * * *